(12) United States Patent
Chen

(10) Patent No.: US 11,938,430 B2
(45) Date of Patent: Mar. 26, 2024

(54) FLOW GUIDE MESH, MEMBRANE ELEMENT, AND FILTER ASSEMBLY

(71) Applicants: Kemflo (Nanjing) Environmental Technology Co., Ltd., Nanjing (CN); KEMFLO INTERNATIOINAL CO., LTD., Pingtung (TW); Ching-Hsiung Lin, Pingtung County (TW)

(72) Inventor: Chen-Feng Chen, Pingtung (TW)

(73) Assignees: KEMFLO (NANJING) ENVIRONMENTAL TECHNOLOGY CO., LTD., Nanjing (CN); KEMFLO INTERNATIONAL CO., LTD., Pingtung (TW); Ching-Hsiung Lin, Pingtung County (TW)

( * ) Notice: Subject to any disclaimer, the term of this patent is extended or adjusted under 35 U.S.C. 154(b) by 554 days.

(21) Appl. No.: 17/279,863

(22) PCT Filed: Mar. 22, 2019

(86) PCT No.: PCT/CN2019/079361
§ 371 (c)(1),
(2) Date: Mar. 25, 2021

(87) PCT Pub. No.: WO2020/191557
PCT Pub. Date: Oct. 1, 2020

(65) Prior Publication Data
US 2021/0394098 A1 Dec. 23, 2021

(51) Int. Cl.
*B01D 39/00* (2006.01)
*B01D 39/16* (2006.01)
(Continued)

(52) U.S. Cl.
CPC ......... *B01D 39/1692* (2013.01); *B01D 61/08* (2013.01); *B01D 61/10* (2013.01);
(Continued)

(58) Field of Classification Search
CPC ........ B01D 27/00; B01D 27/04; B01D 27/06; B01D 27/07; B01D 27/14; B01D 27/146;
(Continued)

(56) References Cited

U.S. PATENT DOCUMENTS

| 4,834,881 A * | 5/1989 | Sawada | B01D 63/10 |
| | | | 210/321.74 |
| 5,096,584 A * | 3/1992 | Reddy | B01D 53/22 |
| | | | 210/321.74 |

(Continued)

FOREIGN PATENT DOCUMENTS

| CN | 101711948 A | 5/2010 |
| CN | 101934198 A | 1/2011 |

(Continued)

*Primary Examiner* — Allison G Fitzsimmons
(74) *Attorney, Agent, or Firm* — WPAT, P.C.

(57) ABSTRACT

A flow guide mesh has a water inlet side and a water outlet side opposite to each other, wherein a first water isolating material is provided on the water inlet side of the flow guide mesh to seal a part of the water inlet side, and an effective water inlet width is defined on the water inlet side, a second water isolating material is provided on the water outlet side of the flow guide mesh to seal a part of the water outlet side, and an effective water outlet width is defined on the water outlet side. In addition, the flow guide mesh has a comb-like structure comprising at least one comb tooth within the effective water outlet width of the water outlet side. Also disclosed are a membrane element and a filter assembly.

23 Claims, 15 Drawing Sheets

(51) Int. Cl.
*B01D 61/08* (2006.01)
*B01D 61/10* (2006.01)
*B01D 61/58* (2006.01)
*B01D 61/02* (2006.01)

(52) U.S. Cl.
CPC ............ *B01D 61/58* (2013.01); *B01D 61/025* (2013.01); *B01D 61/027* (2013.01); *B01D 2311/2649* (2013.01); *B01D 2315/10* (2013.01)

(58) Field of Classification Search
CPC ...... B01D 27/148; B01D 39/00; B01D 39/10; B01D 39/12; B01D 39/14; B01D 39/16; B01D 39/1692; B01D 61/00; B01D 61/002; B01D 61/02; B01D 61/025; B01D 61/027; B01D 61/08; B01D 61/12; B01D 61/14; B01D 61/145; B01D 61/18; B01D 61/22; B01D 63/00; B01D 63/10; B01D 63/101; B01D 63/103; B01D 63/1031; B01D 65/00; B01D 65/003; B01D 65/08; B01D 67/0079; B01D 67/00791; B01D 69/00; B01D 69/107; B01D 69/1071; B01D 69/12; B01D 69/1216; B01D 69/1218; B01D 71/00; B01D 2239/065; B01D 2239/0654
See application file for complete search history.

(56) References Cited

U.S. PATENT DOCUMENTS

| | | | | |
|---|---|---|---|---|
| 5,154,832 A | * | 10/1992 | Yamamura | C02F 1/20 210/321.74 |
| 5,611,841 A | * | 3/1997 | Baker | B01D 63/10 96/4 |
| 5,711,882 A | * | 1/1998 | Hofmann | B01D 63/10 95/55 |
| 8,236,177 B1 | * | 8/2012 | Wood | B01D 63/1031 210/493.4 |
| 8,540,807 B2 | * | 9/2013 | Crowder | B01D 19/0031 95/47 |
| 10,525,414 B2 | * | 1/2020 | Kodama | B01D 69/1218 |
| 10,576,422 B2 | * | 3/2020 | Choi | B01D 63/10 |
| 11,712,664 B2 | * | 8/2023 | Roderick | B01D 63/10 210/321.83 |

FOREIGN PATENT DOCUMENTS

| | | |
|---|---|---|
| CN | 102166477 B | 3/2013 |
| CN | 103521076 A | 1/2014 |
| KR | 20160109967 A | 9/2016 |

* cited by examiner

FLOW GUIDE MESH, MEMBRANE ELEMENT, AND FILTER ASSEMBLY

CROSS-REFERENCE TO RELATED INVENTIONS

This patent invention is a national stage entry under 35 U.S.C. 371 and claims the benefit of International Invention No. PCT/CN2019/079361, filed on Mar. 22, 2019. The entire contents of which are hereby incorporated herein by reference thereto.

BACKGROUND OF THE INVENTION

1. Field of the Invention

The present invention relates to the technical field of water treatment, and in particular to a flow guide mesh and a membrane element and a filter assembly using the flow guide mesh.

2. Description of Related Art

With the rising of people's awareness of healthy drinking water, people's requirements for drinking water quality continue to increase, and various water purification equipments enter the market and enter thousands of households. Now more and more families are beginning to use household water purifiers using reverse osmosis membranes (RO) or nano-filtration membranes (NF).

Both RO membrane water purifier and NF membrane water purifier adopt cross flow filtration technology. With reference to FIG. 1, FIG. 1 shows the principle diagram of the cross flow filtration, wherein arrows in FIG. 1 represent a flow direction of liquid. As shown in FIG. 1, in the cross-flow filtration technology, driven by a pump, a raw water on the left in FIG. 1 flows parallel to a membrane 100 to the right in FIG. 1, and flows downward through the membrane 100 during the flowing process for filtering (that is, the permeate liquid on the lower side in FIG. 1). Therefore, when the raw water flows parallel to the membrane 100, a shear force will be generated to take away particles 200 retained on the membrane 100, thereby making a contamination layer on a surface of the membrane 100 remain at a thinner level.

Therefore, the cross-flow filtration technology shown in FIG. 1 will produce a large amount of concentrated water that needs to be discharged (that is, the concentrate retentate on the right side in FIG. 1). With the rising awareness of environmental protection and the need for an eco-friendly environment, reducing the discharge of the concentrated water is the bottleneck for the promotion and popularization of the RO membrane water purifiers and the NF membrane water purifiers.

Please refer to FIG. 2A, showing a structural diagram of a conventional RO membrane and/or NF membrane filter assembly. As shown in FIG. 2A, the conventional RO membrane and/or NF membrane filter assembly is cylindrical, and is composed of a central tube 300 and a membrane element 400 rolled around the central tube 300. In order to make the raw water flow and complete the filtration, the membrane element 400 is usually provided with at least one flow guide mesh. With reference to FIG. 2B, FIG. 2B is an expanded view of the conventional RO membrane and/or NF membrane filter assembly, in which only the flow guide mesh 410 is shown. According to the common knowledge in the art, those skilled persons in the art can know that the membrane element 400 further includes a filter membrane and a water flow guide layer laminated with the flow guide mesh 410. These layers are arranged under the flow guide mesh 410 in FIG. 2B, so they cannot be reflected in FIG. 2B. In the membrane elements 400 of the conventional RO membrane and/or NF membrane filter assembly, as shown by the arrows in FIG. 2B, the raw water flows in from a water inlet side of the flow guide mesh 410, and the concentrated water flows out from a water outlet side of the flow guide mesh 410. During the filtering process, water flows in an axial direction of the central tube 300.

In the conventional RO membrane and/or NF membrane filter assembly, there are structural characteristics of wide inlet flow channel and short filtration process, which makes the overall filtration flow rate slow. At the same time, in this kind of filter assembly, concentration polarization is prone to occur on the surface of the membrane, causing fouling and clogging, which reduces the desalination rate of the membrane element 400 and the pure water output, thereby seriously affecting the service life of the membrane element 400.

SUMMARY OF THE INVENTION

The purpose of the present invention is to provide a flow guide mesh and a membrane element and filter assembly using the flow guide mesh. The flow direction of the raw water in the membrane element is changed through the structural design of the flow guide mesh, so that the flow direction of the raw water is changed from an axial flow to a radial flow, thereby lengthening the length of the filter flow channel. Therefore, using the filter assembly with the flow guide mesh as described in the present invention, especially the cross flow filter assembly, can scour and separate the pollutants on the surface of the membrane and reduce the precipitation and fouling of the pollutants, so as to slow down the fouling speed on an end of the water outlet side of the membrane element, to mitigate the problem of fouling, thereby greatly increasing the service life of the membrane elements and even the filter assembly.

According to one aspect of this invention, provided is a flow guide mesh, comprising a water inlet side and a water outlet side opposite to each other, wherein the flow guide mesh has a first water isolating material disposed on the water inlet side to seal a part of the water inlet side and define an effective water inlet width, the flow guide mesh has a second water isolating material disposed on the water outlet side to seal a part of the water outlet side and define an effective water outlet width, and the flow guide mesh has a comb structure including at least one comb tooth within the effective water outlet width of the water outlet side.

In an embodiment, the first water isolating material disposed on the water inlet side has at least one opening to form multiple water inlet channels on the part of the water inlet side sealed by the first water isolating material.

In an embodiment, the comb tooth is equidistantly arranged or non-equidistantly arranged.

In an embodiment, the opening is equidistantly arranged or non-equidistantly arranged.

In an embodiment, the effective water inlet width is 110%~140% of a vertical distance between the water inlet side and the water outlet side.

In an embodiment, the effective water outlet width is 60%~90% of the vertical distance between the water inlet side and the water outlet side.

In an embodiment, a projection of the effective water inlet width of the water inlet side on the water outlet side is out of a range of the effective water outlet width.

In an embodiment, the comb tooth has a width W1 and a length L1, a range of W1 is 18-22 mm, and a range of L1 is 80-100 mm.

In an embodiment, a distance between two adjacent comb teeth ranges from 8-12 mm.

In an embodiment, a width of the opening ranges from 3-8 mm, and a distance between two adjacent openings ranges from 60-80 mm.

In an embodiment, the water isolating material is polyurethane glue.

According to another aspect of this invention, provided is a membrane element, comprising a lamination of a layer of water production diversion net, at least one layer of separation membrane, and a layer of any one of the flow guide mesh as mentioned above.

In the embodiment, the flow guide mesh is in contact with a water inlet surface of the separation membrane, and the water production diversion net is in contact with a water outlet surface of the separation membrane.

In an embodiment, the separation membrane is folded, and the water production diversion net is sandwiched in the folded separation membrane.

In an embodiment, the separation membrane is a reverse osmosis membrane or a nano filtration membrane.

In an embodiment, the water production diversion net, the at least one layer of separation membrane, and the flow guide mesh are adhered to each other by an adhesive. The adhesive is a conventional reagent applied to membrane elements in the art.

In a preferable embodiment, sides of the water production diversion net, sides of the separation membrane, and sides of the flow guide mesh are aligned with each other, and the sides are adhered to each other by the adhesive.

In an embodiment, the water inlet side of the flow guide mesh does not adhere to the separation membrane and the water production diversion net at the effective water inlet width, and the water outlet side of the flow guide mesh does not adhere to the separation membrane and the water production diversion net at the effective water outlet width.

In a preferable embodiment, the separation membrane is folded, the water production diversion net is sandwiched in the folded separation membrane, and the structure of the membrane element is the separation membrane, the water production diversion net, the separation membrane, and the flow guide mesh which are sequentially stacked, sides of the separation membrane, sides of the water production diversion net, sides of the separation membrane, and sides of the flow guide mesh are aligned with each other, and the sides are adhered to each other by an adhesive, the water inlet side of the flow guide mesh does not adhere to the separation membrane and the water production diversion net at the effective water inlet width, and the water outlet side of the flow guide mesh does not adhere to the separation membrane and the water production diversion net at the effective water outlet width.

According to a further aspect of this invention, provided is a filter assembly, comprising at least one layer of any one of the above-mentioned flow guide mesh or at least one layer of any one of the above-mentioned membrane element.

In an embodiment, the filter assembly is a cross flow filter assembly.

In a preferable embodiment, providing a filter assembly, comprising a central water collection pipe and at least one layer of membrane element surrounding the central water collection pipe, and the membrane element comprising a lamination of a layer of water production diversion net, at least one layer of separation membrane, and a layer of flow guide mesh, wherein the flow guide mesh has a first water isolating material disposed on the water inlet side to seal a part of the water inlet side and define an effective water inlet width, the flow guide mesh has a second water isolating material disposed on the water outlet side to seal a part of the water outlet side and define an effective water outlet width, the flow guide mesh has a comb structure including at least one comb tooth within the effective water outlet width of the water outlet side, and a projection of the effective water inlet width of the water inlet side on the water outlet side is out of a range of the effective water outlet width. In the preferable embodiment, the effective water inlet width is 110%~140% of a vertical distance between the water inlet side and the water outlet side, and the effective water outlet width is 60%~90% of the vertical distance between the water inlet side and the water outlet side.

In the present invention, first, through the arrangement of the first water isolating material and the second water isolating material, the water inlet width and the water outlet width of the filter assembly are changed. At the same time, by displacing the locations of the effective water inlet width and the effective water outlet width, the flow direction of the raw water is changed from the conventional axial direction along the central tube to the radial direction along the central tube, effectively increasing the length of the filtration process of the raw water. In this way, when the inlet water flow rate is constant, the flow rate of the raw water flowing through the membrane element is effectively increased, and the difference in fluid flow velocity between the inlet end and the outlet end of the membrane element is effectively reduced, thereby improving the concentration polarization phenomenon.

Secondly, the comb structure within the effective water outlet width on the water outlet side of the flow guide mesh further increases the space of the filtering flow channel of the raw water, thereby further slowing down the precipitation and fouling of pollutants on the surface of the membrane element. In addition, by forming multiple openings on the water inlet side of the first water isolating material to increase the effective water inlet amount of the raw water, the dead zone of the membrane element can be eliminated and the end flow rate can be increased, and at the same time, the effect of flushing and diluting pollutants is produced, so as to further slow down the precipitation and fouling of pollutants on the surface of the membrane element.

Furthermore, in the present invention, the flow direction of the raw water in the membrane element is changed by the structural design of the flow guide mesh, so the flow direction of the raw water is changed from an axial flow to a radial flow, thereby lengthening the length of the filtering flow channel. Therefore, the filter assembly of the flow guide mesh described in the present invention, especially the cross flow filter assembly, can realize the flushing of contaminants on the surface of the separation membrane and reduce the precipitation and fouling of contaminants, so as to slow down the fouling speed on the water outlet side of the membrane element, mitigate the fouling problem, and greatly increase the service life of the membrane element and even the filter assembly.

BRIEF DESCRIPTION OF THE DRAWINGS

In order to more clearly describe the technical solutions in the embodiments of the present invention, the following will briefly introduce the accompanying drawings used in the description of the embodiments. Obviously, the accompanying drawings in the following description are only some embodiments of the present invention. For those persons skilled in the art, without creative work, other drawings can be obtained based on these drawings.

DETAILED DESCRIPTION OF PREFERRED EMBODIMENT

Figure 1:
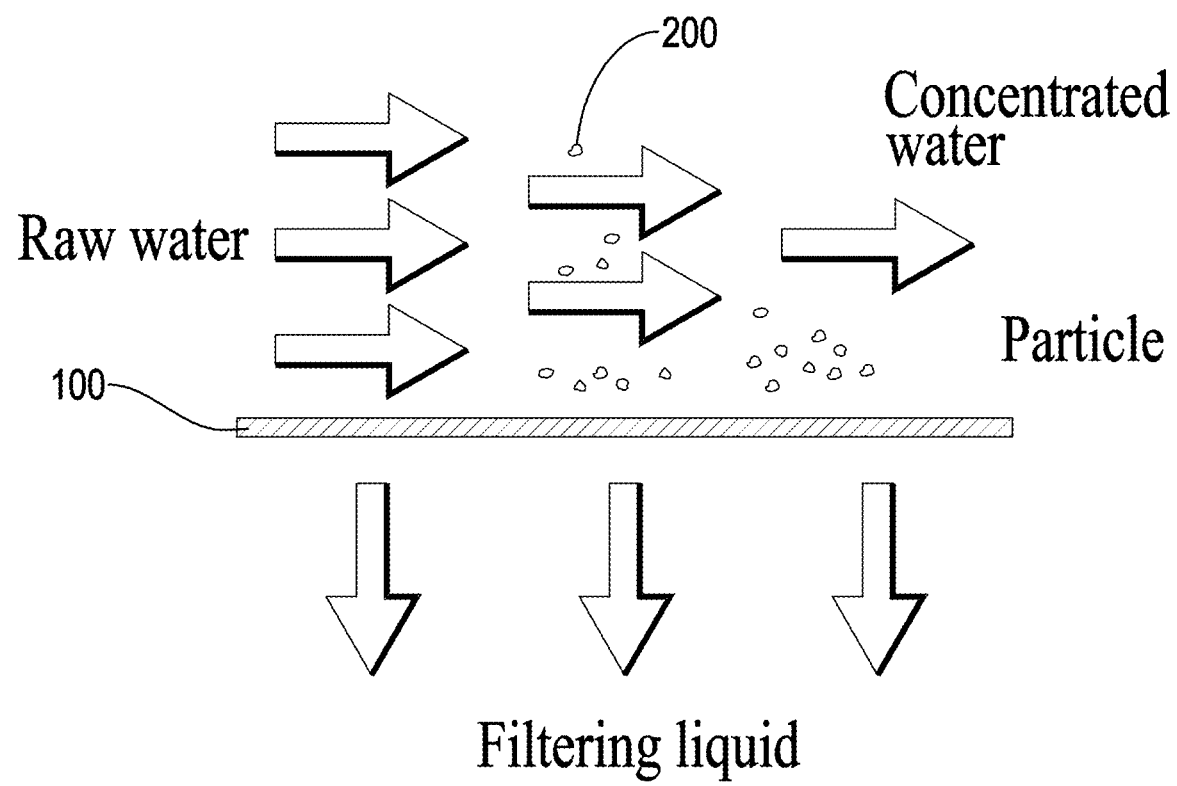
FIG. 1 is a principle diagram of a cross-flow filtration.

The technical solutions in the embodiments of the present invention will be clearly and completely described below in conjunction with the drawings in the embodiments of the present invention. Obviously, the described embodiments are only a part of the embodiments of the present invention, rather than all the embodiments. Based on the embodiments in this invention, all other embodiments obtained by those skilled in the art without creative work belong to the scope of protection of this invention.

The terms "first", "second", "third", etc. (if any) in the specification and claims of this invention and the above-mentioned drawings are used to distinguish similar objects, and not necessarily used to describe a specific order or sequence. It should be understood that the objects described in this way are interchangeable under appropriate circumstances. In addition, the terms "including" and "having" and any variations of them are intended to cover non-exclusive inclusions.

In this patent document, the drawings discussed below and various embodiments used to describe the principles disclosed in this invention are only for illustration, and should not be construed as limiting the scope of the disclosure of this invention. Those persons skilled in the art will understand that the principles of the present invention can be implemented in any suitably arranged system. Exemplary embodiments will be described in detail, and examples of these embodiments are shown in the drawings. In addition, a terminal according to an exemplary embodiment will be described in detail with reference to the accompanying drawings. The same reference numerals in the drawings refer to the same elements.

The terms used in the specification of this invention are only used to describe specific implementations, and are not intended to show the concept of this invention. Unless there is a clearly different meaning in the context, the expression used in the singular form encompasses the expression in the plural form. In the specification of this invention, it should be understood that terms such as "including", "having" and "containing" are intended to indicate the possibility of the features, numbers, steps, actions or combinations thereof disclosed in the specification of this invention, but not intended to indicate the possibility that one or more other features, numbers, steps, actions or combinations thereof may exist or may be added is excluded. The same reference numerals in the drawings refer to the same parts.

The present embodiment provides a flow guide mesh. Detailed description will be given below in conjunction with FIG. 3 and FIG. 4.

Figure 3:
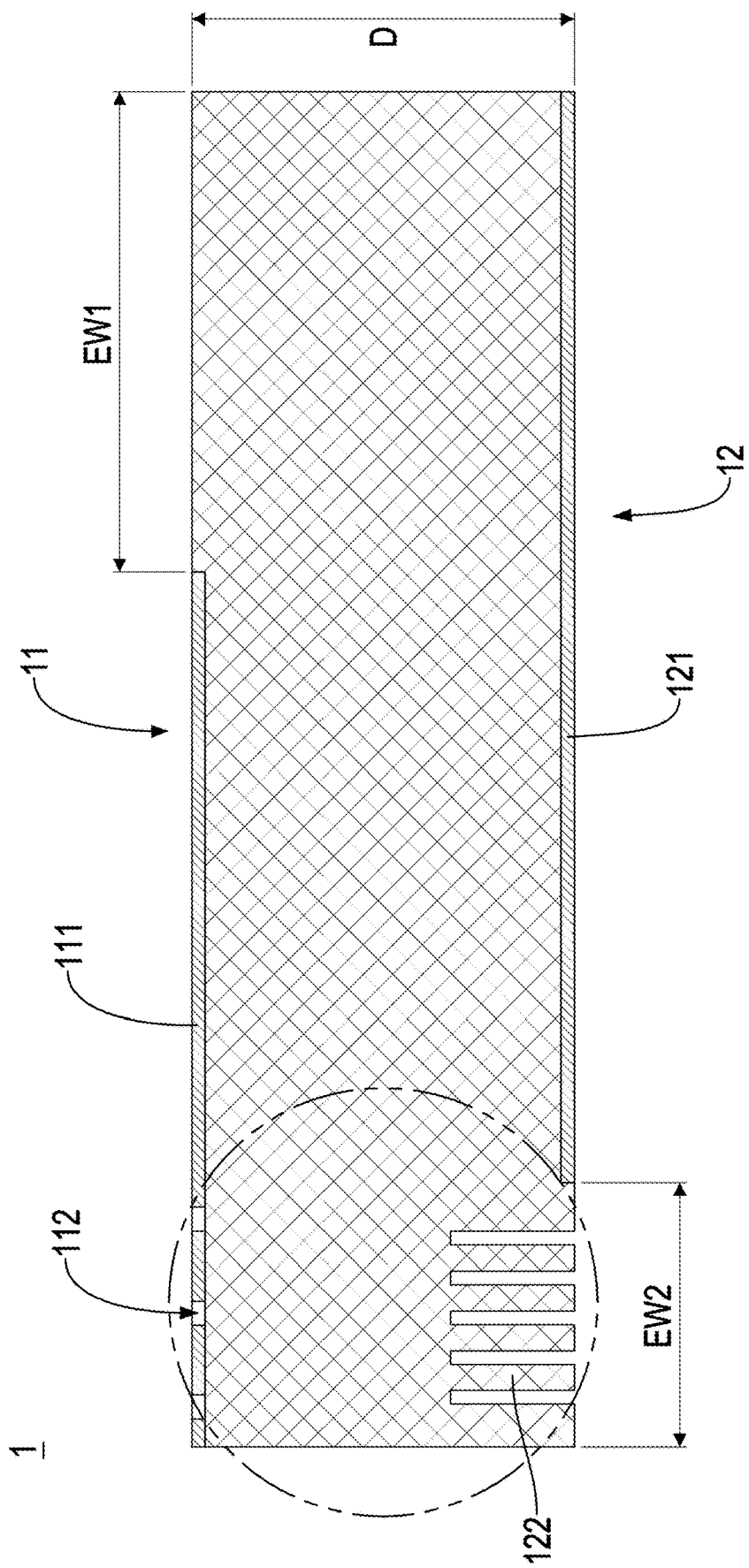
FIG. 3 is a structural diagram of an embodiment of a flow guide mesh in accordance with the present invention.

With reference to FIG. 3, FIG. 3 is a structural diagram of an embodiment of a flow guide mesh 1 of the present invention. As shown in FIG. 3, the flow guide mesh 1 has a water inlet side 11 and a water outlet side 12 opposite to each other. With reference to FIG. 3, a first water isolating material 111 is provided on the water inlet side 11 of the flow guide mesh 1 to seal a part of the water inlet side 11 and define an effective water inlet width EW1. A second water isolating material 121 is provided on the water outlet side 12 of the flow guide mesh 1 to seal a part of the water outlet side 12 and define an effective water outlet width EW2 on the water outlet side 12.

With further reference to FIG. 3, the flow guide mesh 1 has a comb structure including at least one comb tooth 122 within the effective water outlet width EW2 of the water outlet side 12. At least one opening 112 is formed on the first water isolating material 111 arranged on the water inlet side 11 to form multiple water inlet channels on the part of the water inlet side 11 sealed by the first water isolating material 111.

With reference to FIG. 3, the projection of the effective water inlet width EW1 of the water inlet side 11 on the water outlet side 12 does not fall within the range of the effective water outlet width EW2. Those persons skilled in the art can understand that the positional relationship between the effective water inlet width EW1 and the effective water outlet width EW2 may not be limited to the example shown in FIG. 3. It may also have other positional relationships, as long as it is satisfied that the projection of the effective water inlet width EW1 on the water outlet side 12 does not fall within the range of the effective water outlet width EW2.

With reference to FIG. 3, the effective water inlet width EW1 is 110%~140% of a vertical distance D between the water inlet side 11 and the water outlet side 12. The effective water outlet width EW2 is 60%~90% of the vertical distance D between the water inlet side 11 and the water outlet side 12.

In the present embodiment, the water isolating material 111, 121 is polyurethane glue, which is a commercial product.

Hereinafter, with reference to FIG. 4, the comb structure including at least one comb tooth 122 and the opening 112 on the first water isolating material 111 will be described in detail.

Figure 4:
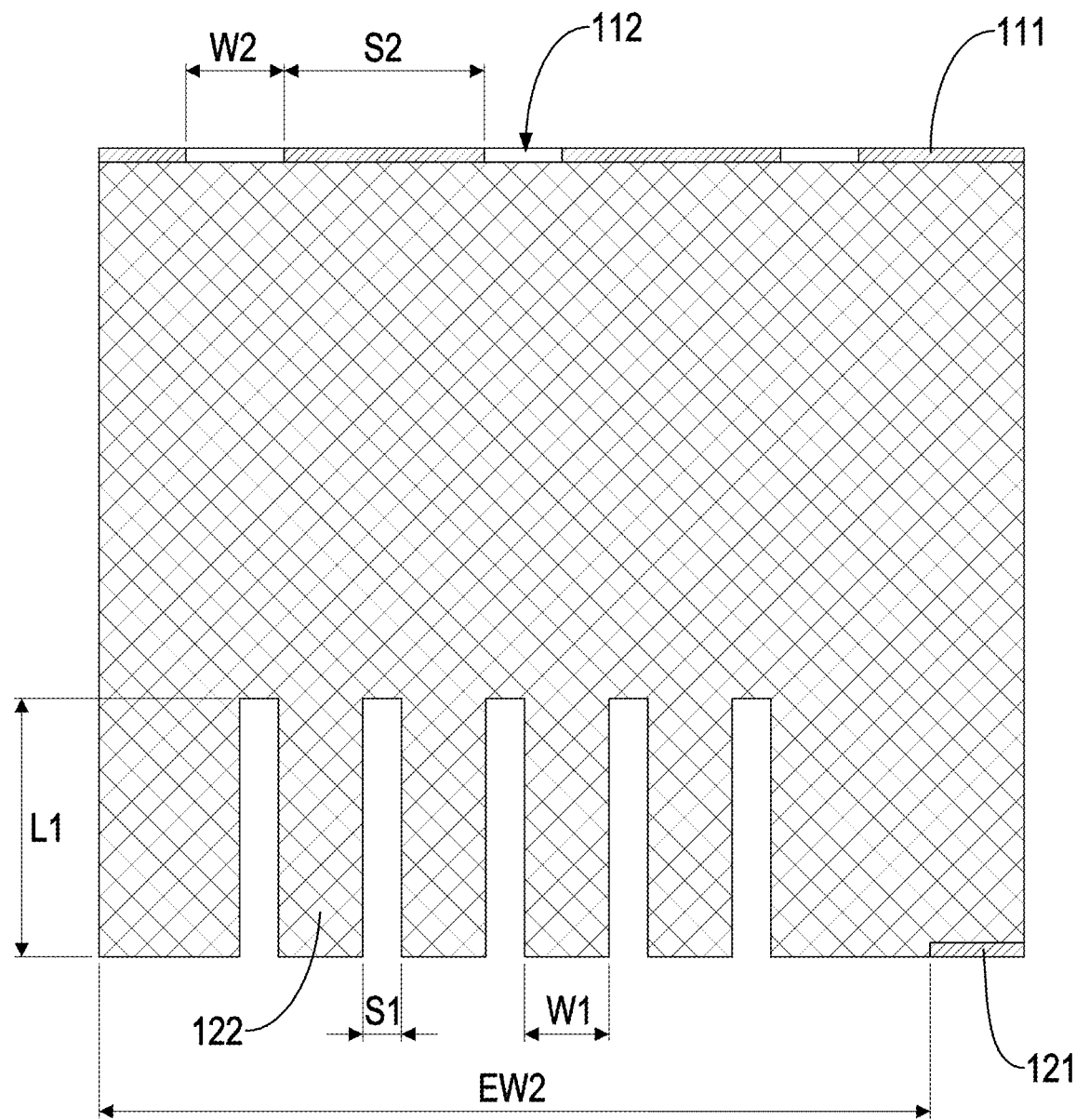
FIG. 4 is an enlarged side view of the flow guide mesh in FIG. 3.

With reference to FIG. 4, definition: a width of the comb tooth 122 is W1, a length of the comb tooth is L1, and a distance between the comb tooth 122 and an adjacent comb tooth 122 is S1. The range of the width W1 of the comb tooth 122 is 18-22 mm, and the range of the length L1 of the comb tooth 122 is 80-100 mm, and the distance S1 between the adjacent comb teeth 122 ranges from 8-12 mm. As shown in FIG. 3, it is defined: a width of the opening 112 is W2, and a distance between the opening 112 and an adjacent opening 112 is S2. The width W2 of the openings 112 ranges from 3-8 mm, and the distance S2 between the adjacent openings 112 ranges from 60-80 mm.

Figure 5A:
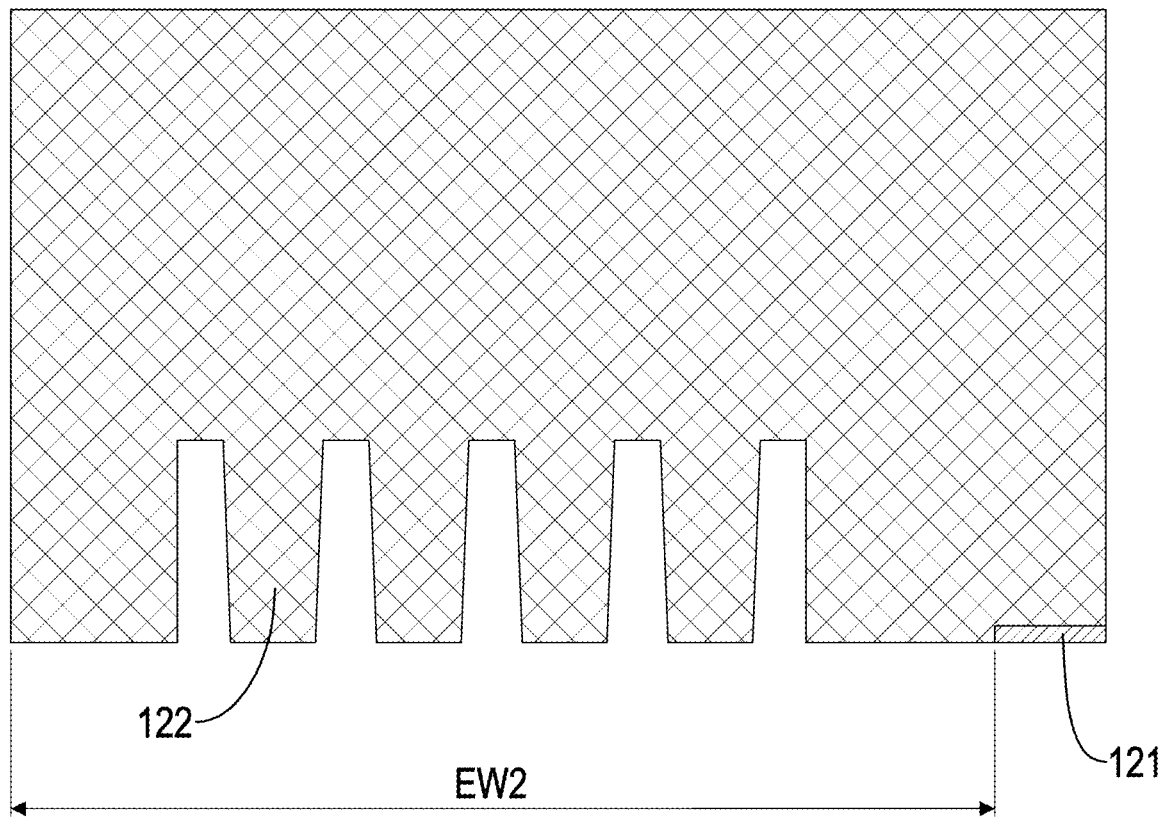
FIGS. 5A to 5C are structural diagrams of different embodiments of comb teeth.
Figure 5B:
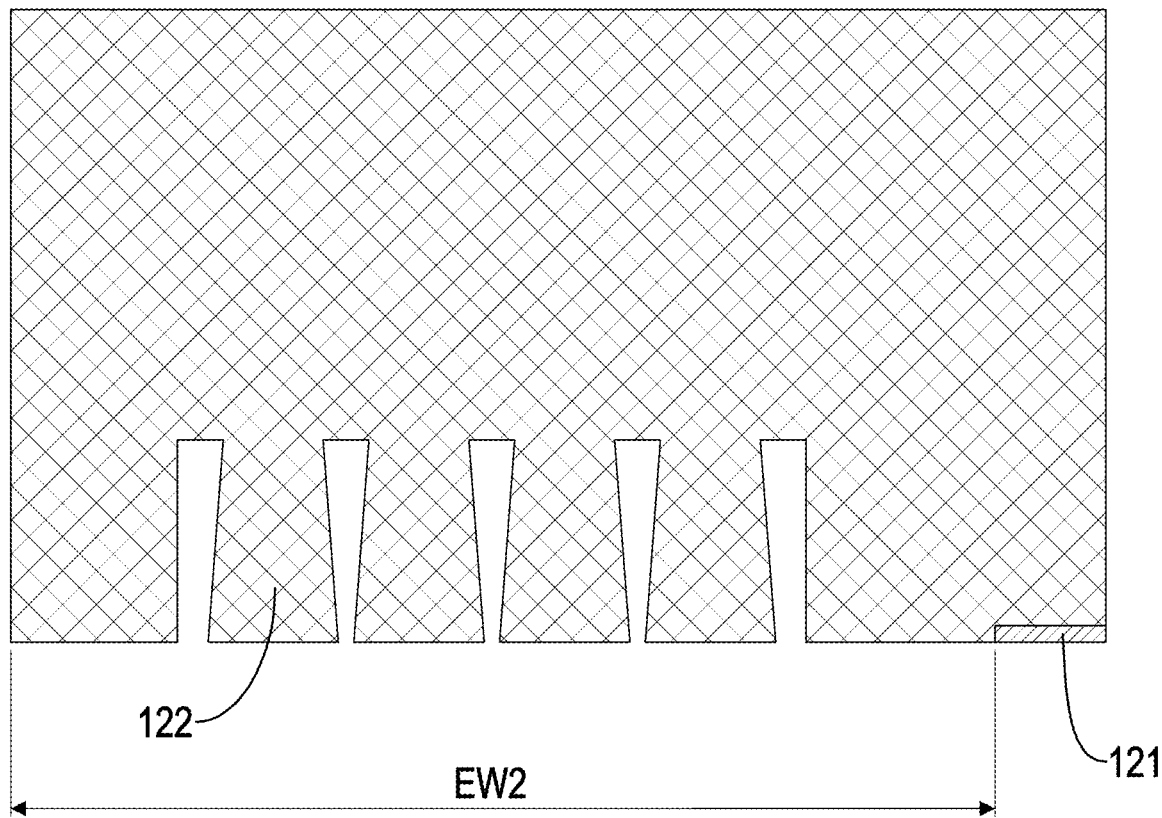
Figure 5C:
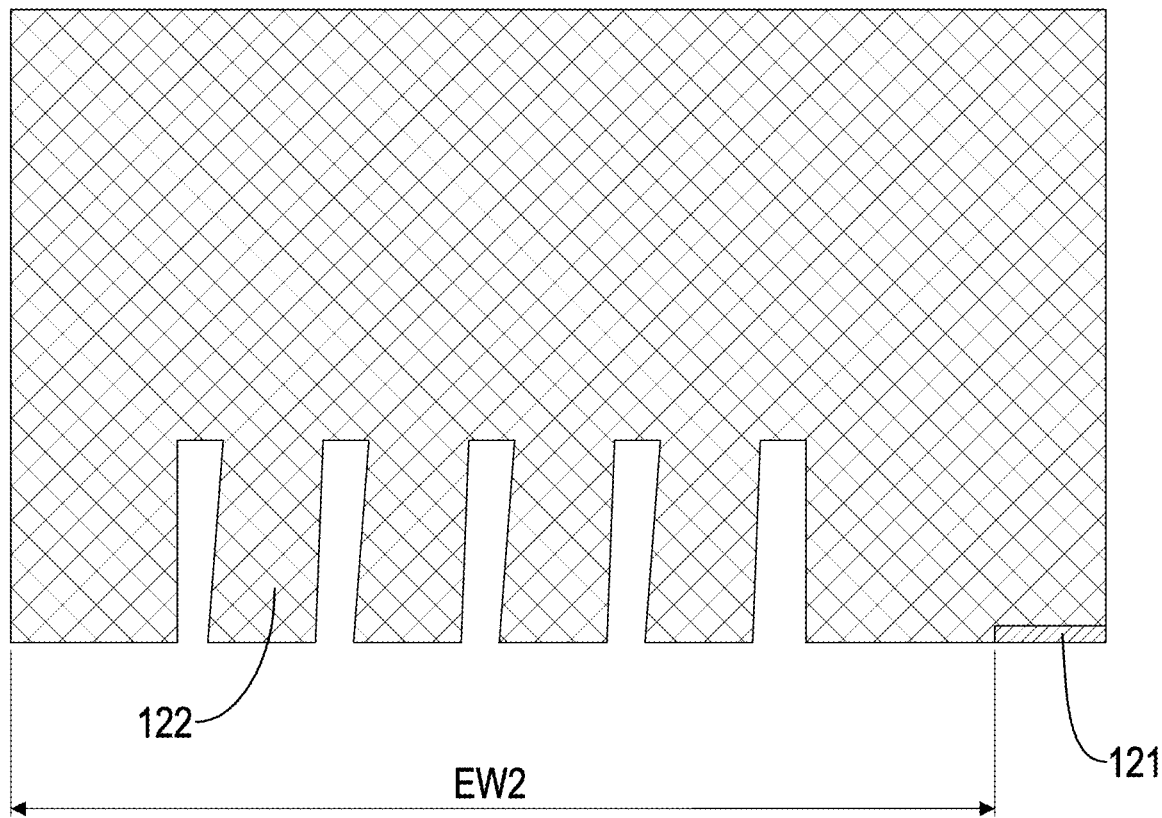

Those persons skilled in the art may know that the comb teeth 122 may be equidistantly arranged as shown in FIGS. 3 and 4, or may be non-equidistantly arranged. The opening 112 may be equidistantly arranged as shown in FIGS. 3 and 4, and can also be non-equidistantly arranged. In addition, those persons skilled in the art may know that the comb tooth 122 may also have other shapes, and is not limited to the structure shown in FIG. 3 or FIG. 4. For example, the comb tooth 122 may also have a structure as shown in FIGS. 5A to 5C.

Figure 6A:
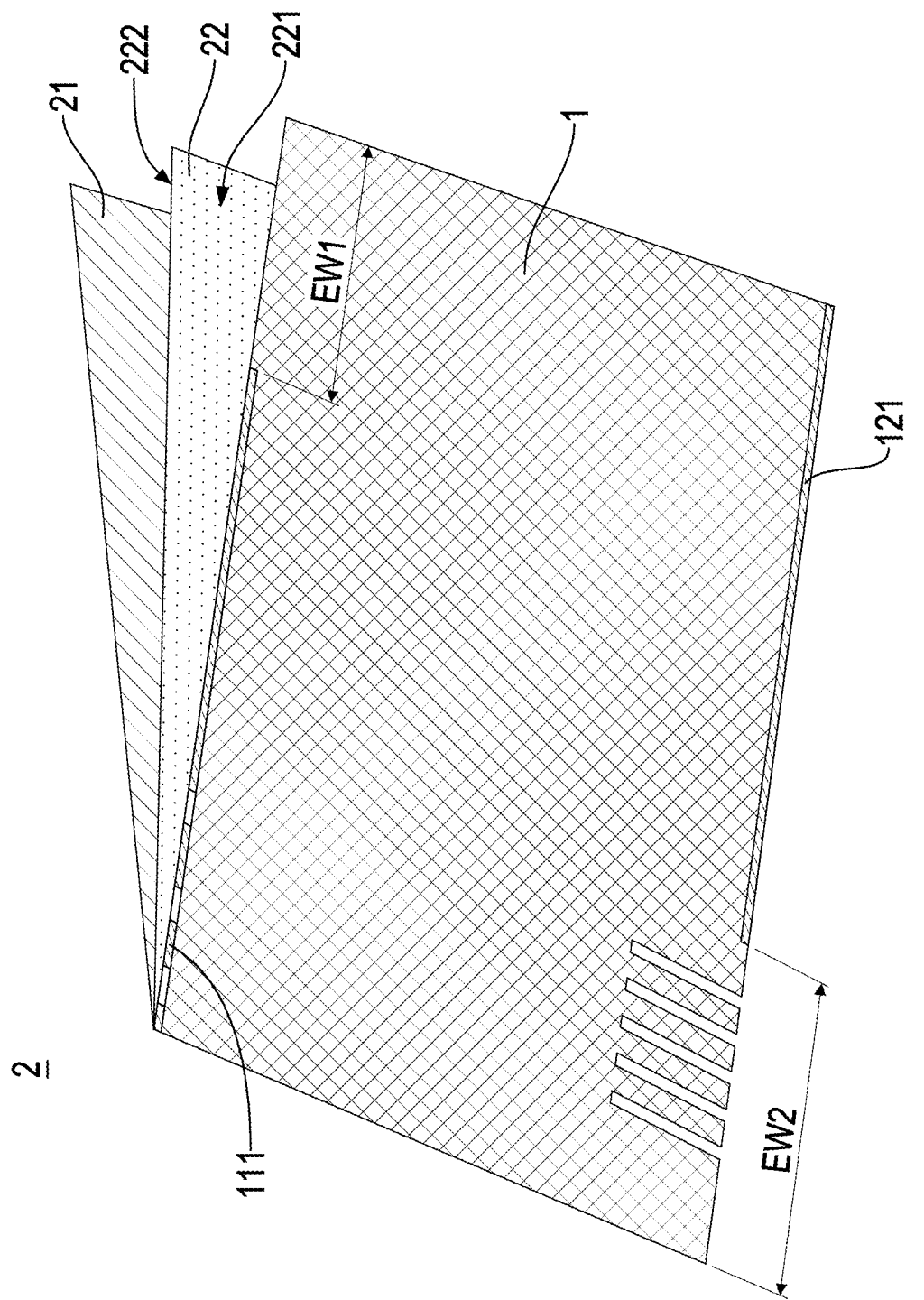
FIGS. 6A to 6C are structural diagrams of different embodiments of membrane elements in the present invention.

Additionally, the invention also provides a membrane element 2. As shown in FIG. 6A, the membrane element 2 includes a lamination of a layer of water production diversion net 21, at least one layer of separation membrane 22, and a layer of flow guide mesh 1. The flow guide mesh 1 is in contact with a water inlet surface 221 of the separation membrane 22, and the water production diversion net 21 is in contact with a water outlet surface 222 of the separation membrane 22.

In the present invention, the separation membrane 22 may be a reverse osmosis membrane or a nano filtration membrane.

For the purpose of clarity, without showing the specific structure of an adhesive in FIG. 6A, those persons skilled in the art can understand that the water production diversion net 21, the separation membrane 22, and the flow guide mesh 1 are adhered to each other by the adhesive. This kind of the adhesive is a product known in the art. For example, as shown in FIG. 6A, sides of the water production diversion net 21, sides of the separation membrane 22, and sides of the flow guide mesh 1 are aligned with each other, and the adhesive is coated on at least three sides of the water production diversion net 21, the separation membrane 22, and the flow guide mesh 1. So the water production diversion net 21, the separation membrane 22, and the flow guide mesh 1 are shown in FIG. 6A, for example, but not limited to, an upper edge, a right edge, and a lower edge are glued together. Additionally, the water inlet side 11 of the flow guide mesh 1 does not adhere to the separation membrane 22 and the water production diversion net 21 at the effective water inlet width EW1, and the water outlet side 12 of the flow guide mesh 1 does not adhere to the separation membrane 22 and the water production diversion net 21 at the effective water outlet width EW2. That is to say, in an embodiment, in addition to the effective water inlet width EW1 and the effective water outlet width EW2, the remaining sides of the flow guide mesh 1, the separation membrane 22, and the water production diversion net 21 are adhered to each other.

Figure 6B:
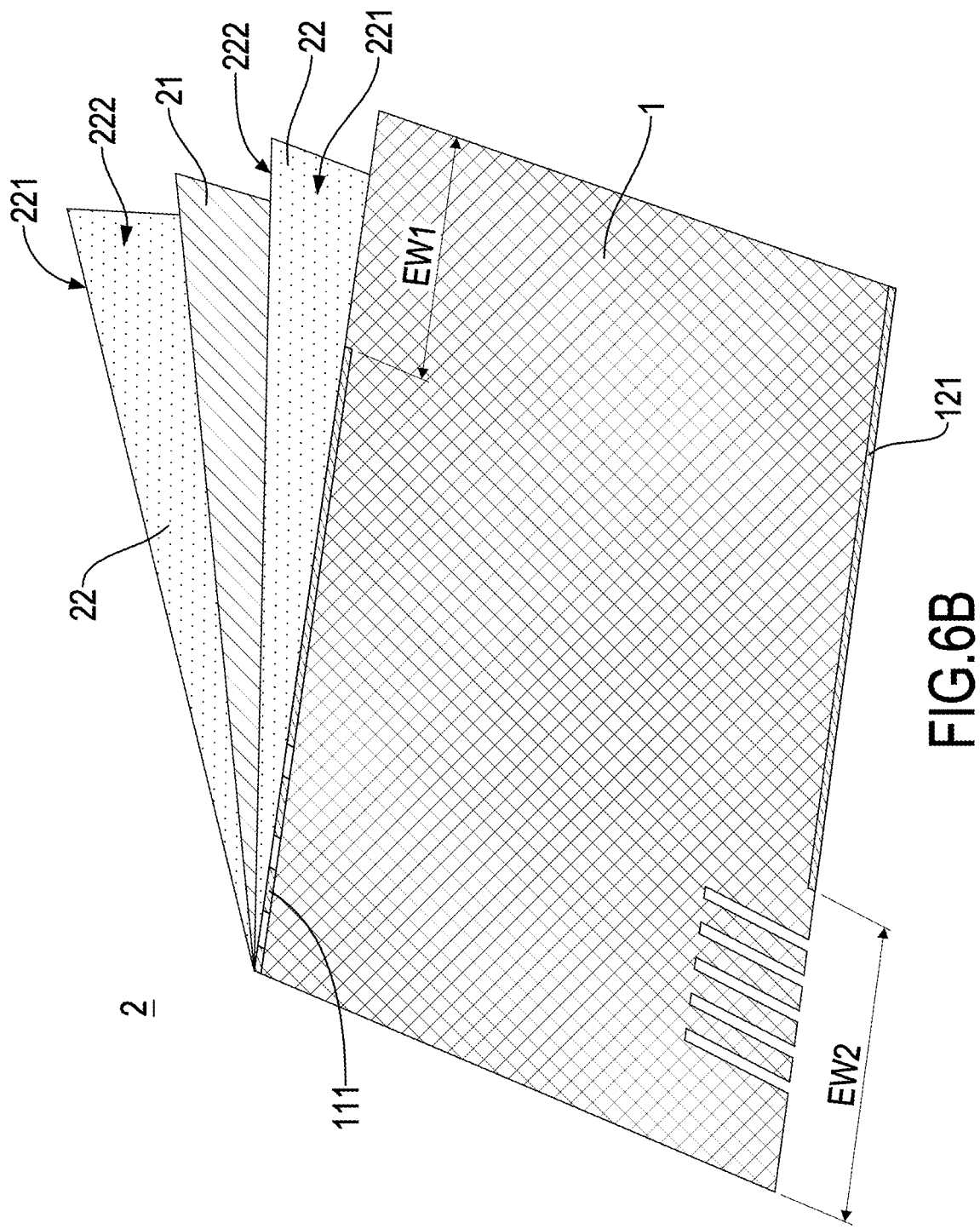

Further, in another embodiment of the present invention, the membrane element 2 in FIG. 6A may also have a structure as shown in FIG. 6B. The difference from the structure in FIG. 6A is that the separation membrane 22 is folded. Therefore, in the embodiment, as shown in FIG. 6B, the water production diversion net 21 is sandwiched on the folded surface of the separation membrane 22. That is to say, in the membrane element 2 shown in FIG. 6B, since the separation membrane 22 is folded, both sides of the water production diversion net 21 are in contact with the water outlet surface 222 of the separation membrane 22.

Figure 6C:
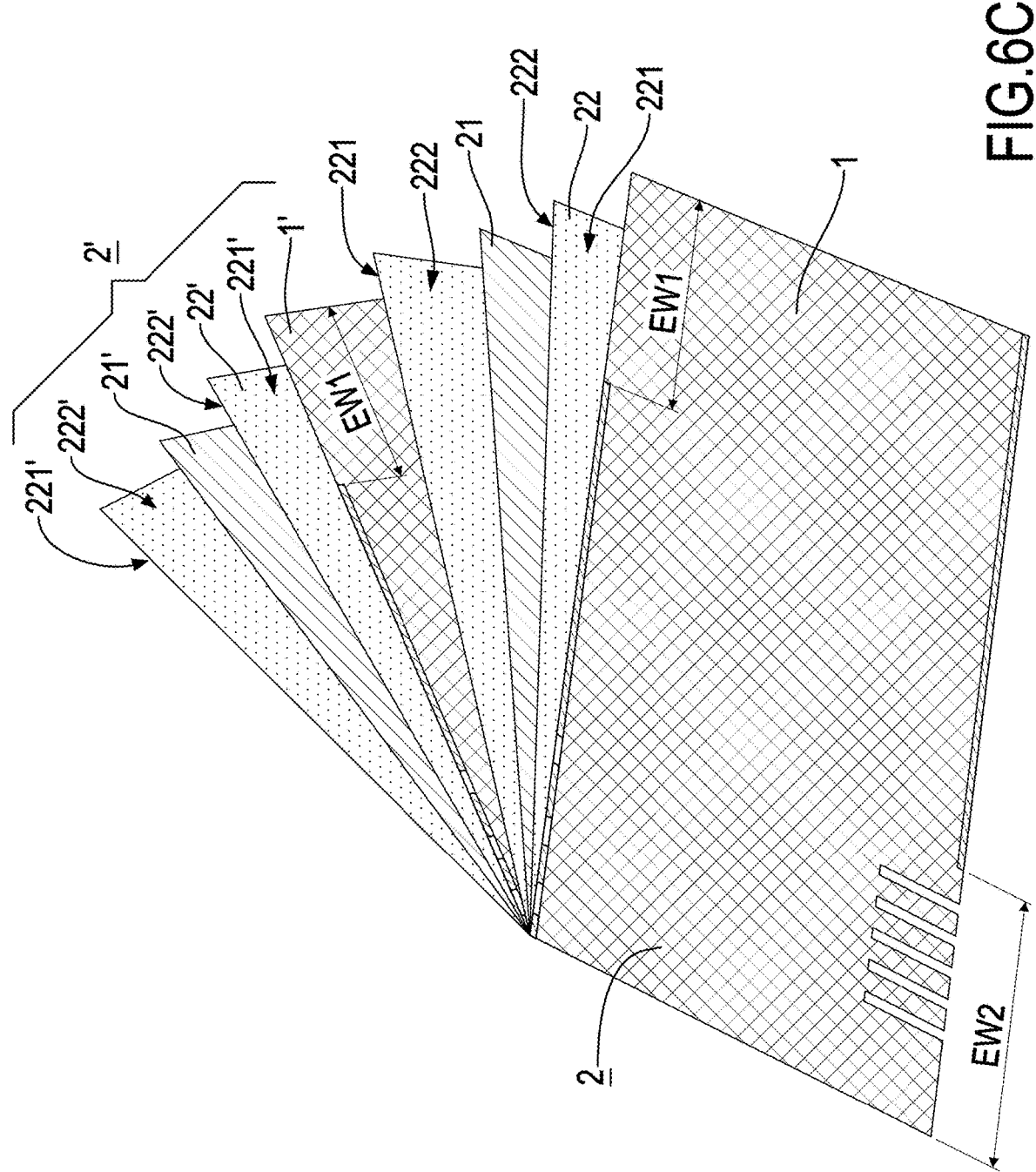

Furthermore, in another embodiment of the present invention, the membrane element 2 in FIG. 6A can also be arranged in layers to serve as a part of a filter assembly. The laminated structure of the membrane element 2 is shown in FIG. 6C. As shown in FIG. 6C, the membrane element 2' has the same structure as the membrane element 2, and the membrane element 2' and the membrane element 2 are laminated. In this way, because the separation membrane 22 of the membrane element 2 of the first layer is folded and the water production diversion net 21 is sandwiched between the separation membranes 22, the water inlet surface 221 of the separation membrane 22 of the membrane element 2 of the first layer is in contact with the flow guide mesh 1' of the membrane element 2' of the second layer. Of course, in the case of three or more layers, the water inlet surface of the separation membrane of an upper layer of membrane element is in contact with the flow guide mesh of the next layer of membrane element, so that the water inlet surface of each layer of separation membrane can enter the water through a corresponding flow guide mesh.

Figure 7:
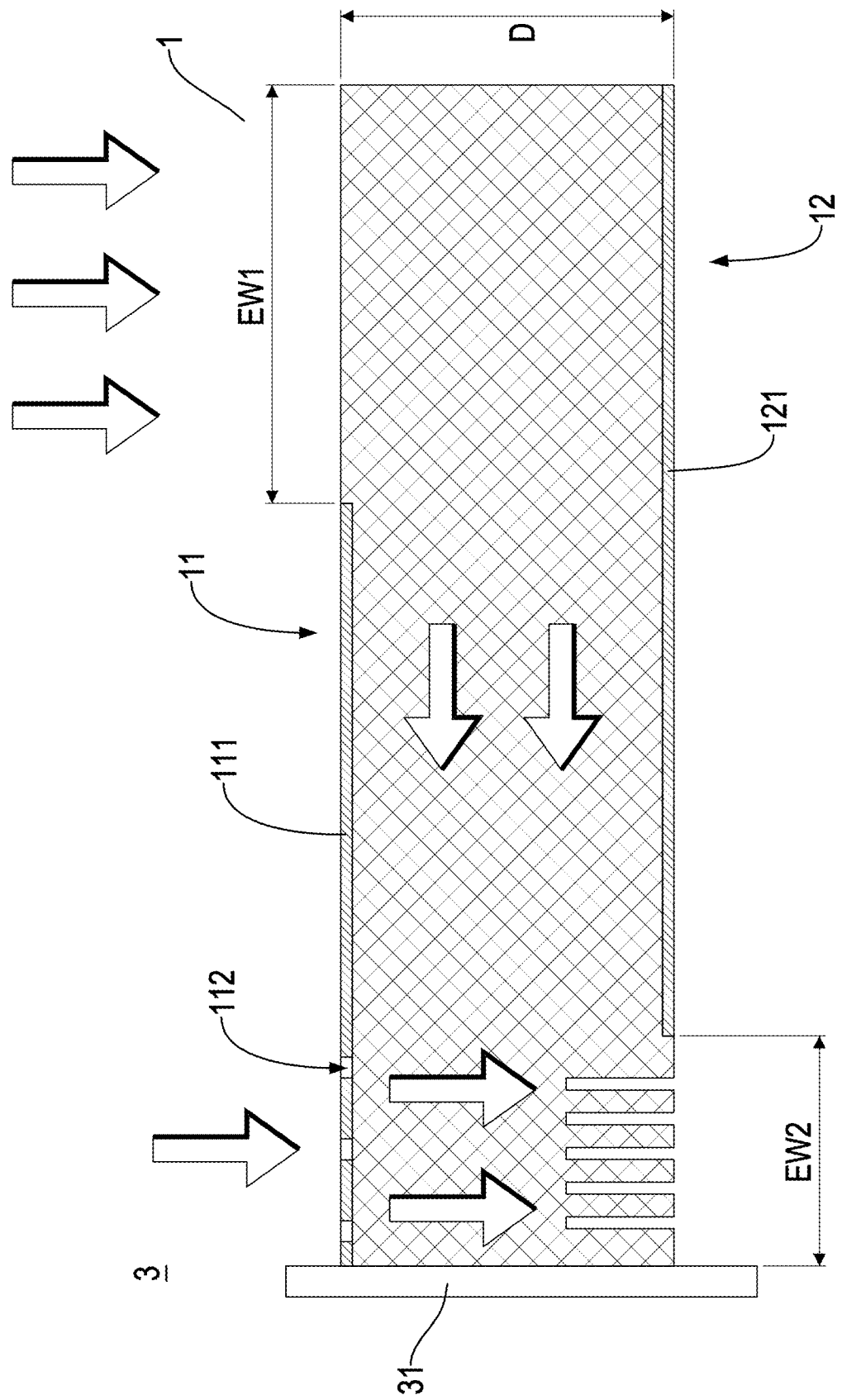
FIG. 7 is a structural diagram of a filter assembly of the present invention, wherein a membrane element of the filter assembly is in an unfolded state.

Additionally, the present invention also provides a filter assembly 3, and as shown in FIG. 7, the filter assembly 3 includes a central water collection pipe 31 and at least one layer of the membrane element 2 as shown in FIG. 6A or FIG. 6B surrounding the central water collection pipe 31. Of course, when the filter assembly 3 includes a multilayer membrane element, the laminated structure of the membrane element is as shown in FIG. 6C. In the expanded view of FIG. 7, since the membrane element 2 is a laminated structure, only the flow guide mesh 1 can be shown in FIG. 7. For the purpose of clarity, the detailed structure of the central water collection pipe 31 is not shown in FIG. 7. Those persons skilled in the art may know that the central water collection pipe 31 is a conventional component in the art and has any structure known in the art. In the filter assembly 3 shown in FIG. 7, the directions of arrows represent a flow direction of water.

With reference to FIG. 7, when water flows through the water inlet side 11 of the flow guide mesh 1 into the flow guide mesh 1 and enters the filter assembly 3, since the first water isolating material 111 is provided on the water inlet side 11, raw water can only enter from the effective water inlet width EW1. Moreover, since the water outlet side 12 corresponding to the effective water inlet width EW1 is the second water isolating material 121, the water can only flow along the width direction of the flow guide mesh 1 (that is, a direction perpendicular to the vertical distance D between the water inlet side 11 and the water outlet side 12). Then the water flows out via the effective water outlet width EW2 of the water outlet side 12. Different from the flow direction of water in the conventional RO membrane and/or NF membrane filter assembly in FIG. 2B, the flow direction of the raw water of the flow guide mesh 1 described in this invention is changed from a conventional axial direction along the central tube 300 to a radial direction of the central water collection pipe 31, and this effectively increases the length of filtering process of the raw water. At the same time, through the comb shaped structure within the effective water outlet width EW2 of the water outlet side 12 of the flow guide mesh 1, the space of filtering flow channel of the raw water is further increased (make the raw water more contact with the separation membrane 222 under the flow guide mesh 1), so as to further slow down the precipitation and fouling of pollutants on the surface of the membrane element 2. In addition, by forming multiple openings 112 on the first water isolating material 111 on the water inlet side 11 of the flow guide mesh 1 to increase the effective water inlet of the raw water, the dead zone of the membrane element 2 can be eliminated and the end flow rate can be increased and at the same time an effect of flushing and diluting pollutants is produced, thereby further slowing down the precipitation and fouling of pollutants on the surface of the membrane element 2.

Figure 2A:
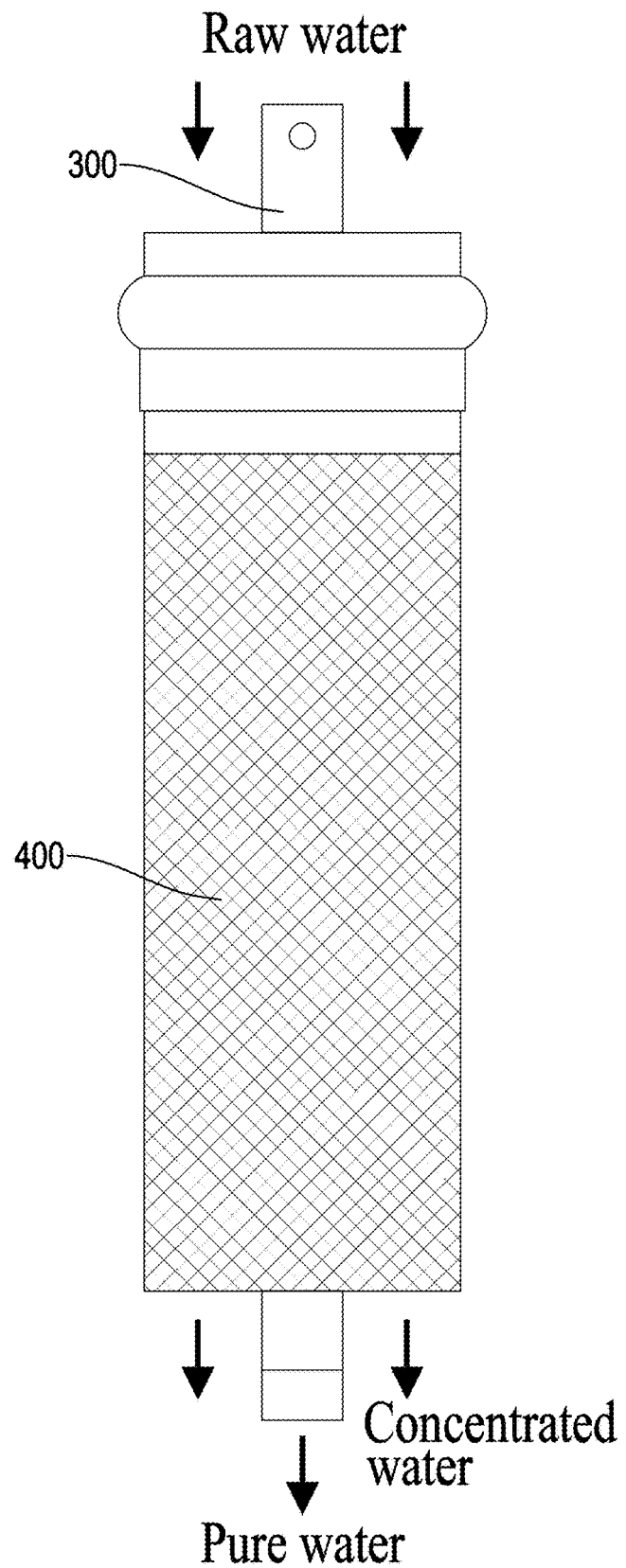
FIG. 2A is a structural diagram of a conventional RO membrane and/or NF membrane filter assembly.
Figure 2B:
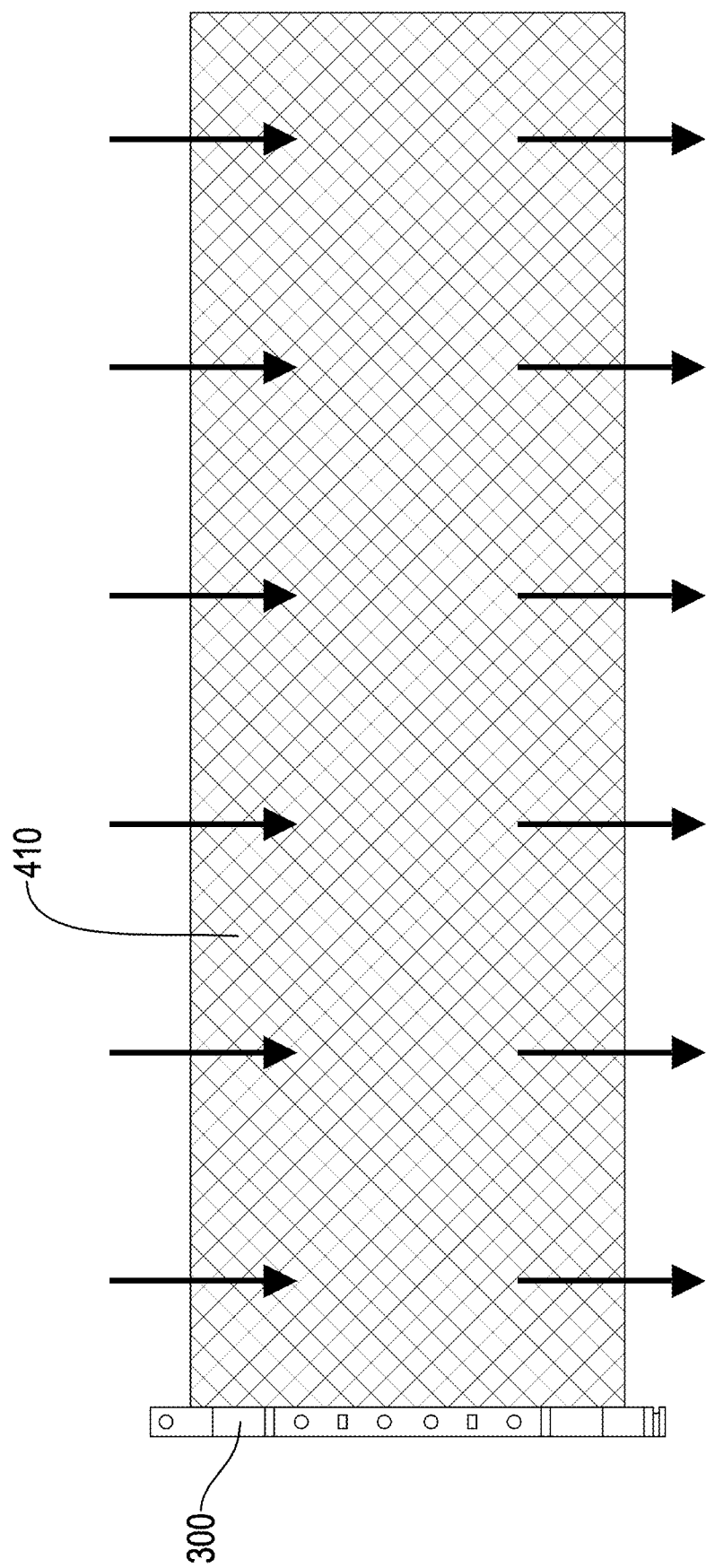
FIG. 2B is an expanded view of the conventional RO membrane and/or NF membrane filter assembly in FIG. 2A.

The applicant further verified the filtration effects of the conventional RO membrane filter assembly shown in FIG. 2A and the filter assembly 3 described in this invention. In the experimental verification, the conventional RO membrane filter assembly shown in FIG. 2A and the filter assembly 3 described in this invention were installed in a reverse osmosis water purifier, according to GB 34914-2017 "Minimum allowable value of water efficiency and water efficiency grades for reverse osmosis drinking water treatment" and the flow-life, flow loss, and salt rejection rate of the conventional RO membrane filter assembly shown in FIG. 2A and the filter assembly 3 described in this invention were separately detected, and the test results are obtained and shown in FIGS. 8A to 8C.

Figure 8A:
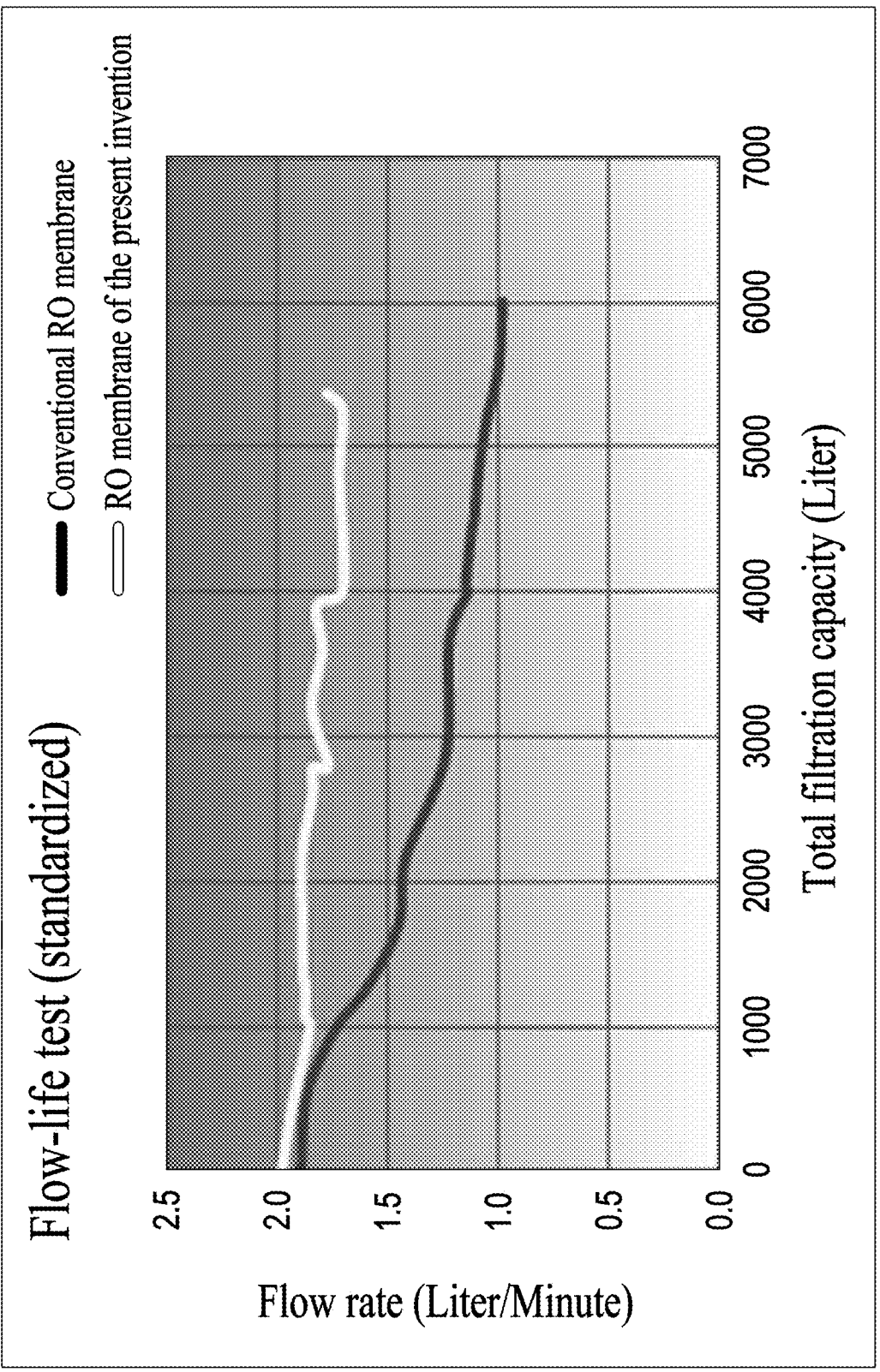
FIGS. 8A to 8C are experimental verification data of the filter assembly according to an embodiment of the present invention.
Figure 8B:
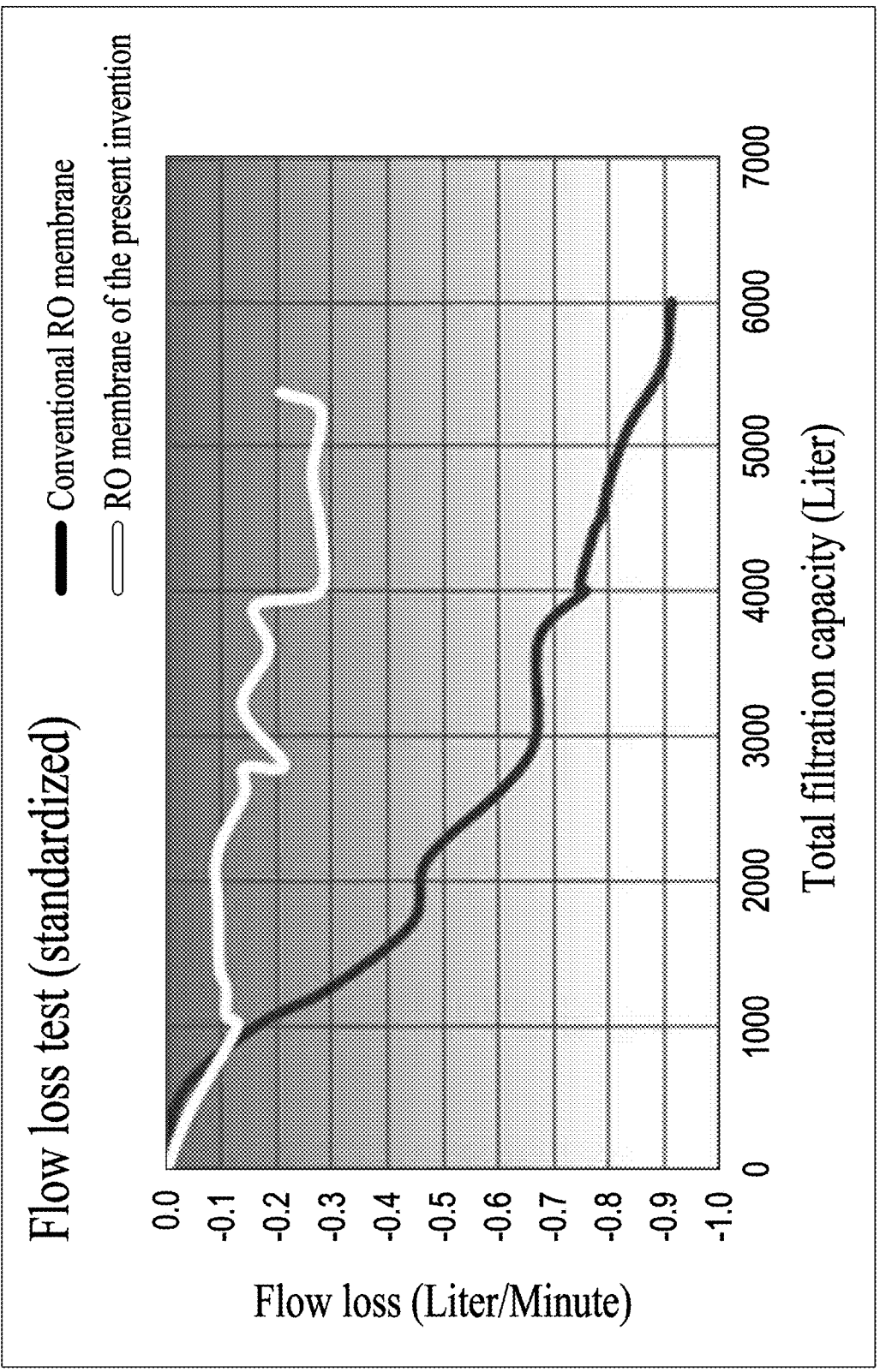
Figure 8C:
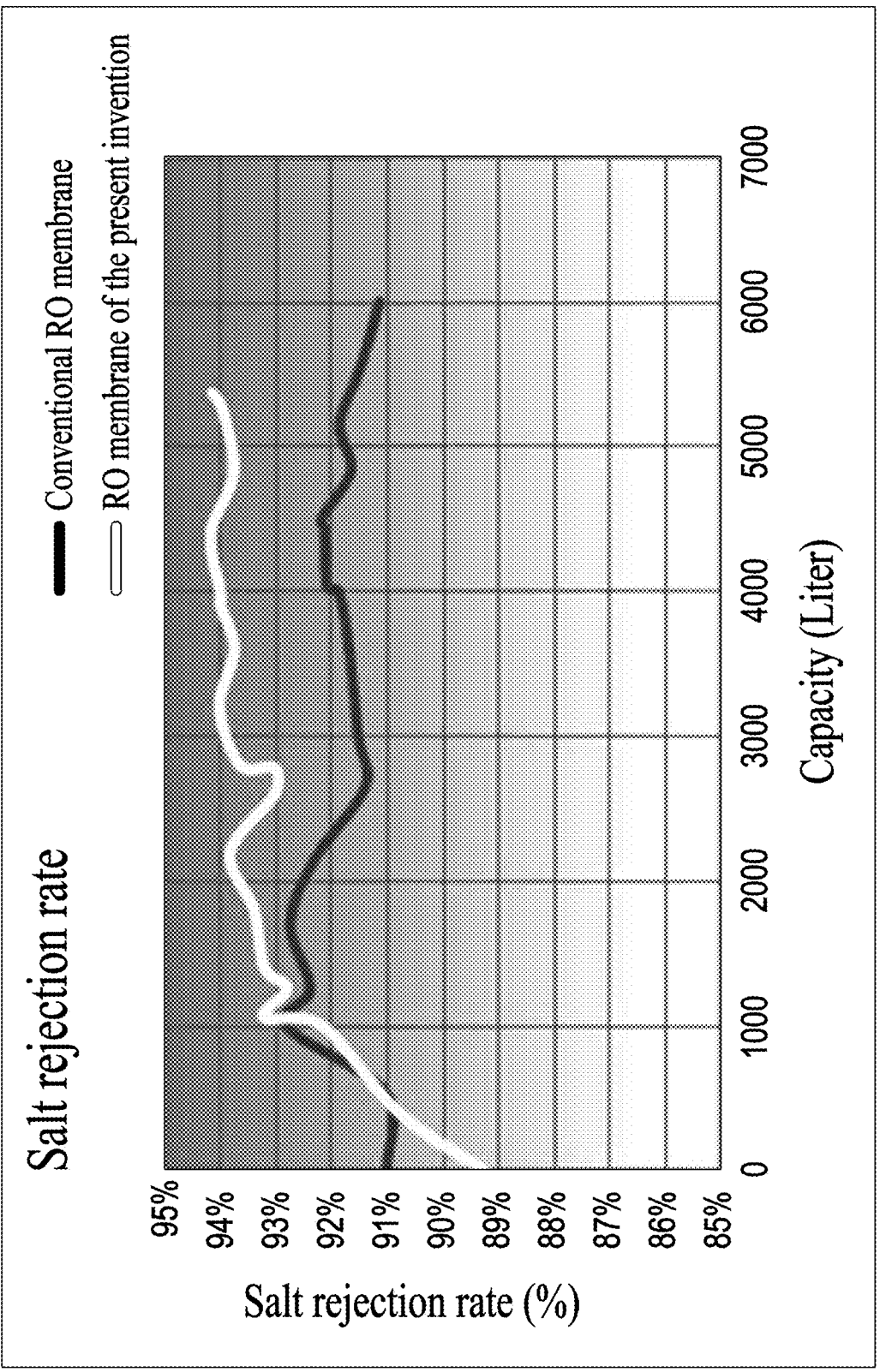

As shown in FIGS. 8A to 8C, the filter assembly 3 of the present invention can significantly reduce the flow loss during the filtering process (about 30% reduction), and significantly increase the salt rejection rate.

In the invention, the flow direction of the raw water in the membrane element 2, 2' is changed by the structural design of the flow guide mesh 1, 1', so the flow direction of the raw water is changed from the axial flow to the radial flow, thereby lengthening the length of the filtering flow channel. Therefore, the filter assembly 3 of the flow guide mesh 1, 1' described in the present invention, especially the cross flow filter assembly, can realize the flushing of contaminants on the surface of the separation membrane 22, 22' and reduce the precipitation and fouling of contaminants, so as to slow down the fouling speed on the water outlet side 12 of the membrane element 2, 2', improve the fouling problem, and greatly increase the service life of the membrane element 2, 2' and even the filter assembly 3.

The above are only the preferred embodiments of this invention. It should be pointed out that for those of ordinary skill in the art, without departing from the principles of this invention, several improvements and modifications can be made, and these improvements and modifications should also be considered the scope of protection of this invention.

INDUSTRIAL APPLICABILITY

The subject matter of this invention can be manufactured and used in the industry, and has industrial applicability.

What is claimed is:

1. A flow guide mesh, comprising a water inlet side and a water outlet side opposite to each other, wherein
    the flow guide mesh has a first water isolating material disposed on the water inlet side to seal a part of the water inlet side and define an effective water inlet width;
    the flow guide mesh has a second water isolating material disposed on the water outlet side to seal a part of the water outlet side and define an effective water outlet width; and
    the flow guide mesh has a comb structure including at least one comb tooth within the effective water outlet width of the water outlet side;
    the effective water inlet width is 110%~140% of a vertical distance between the water inlet side and the water outlet side, the effective water outlet width is 60%~90% of the vertical distance between the water inlet side and the water outlet side, and a projection of the effective water inlet width of the water inlet side on the water outlet side is out of a range of the effective water outlet width.

2. The flow guide mesh as claimed in claim 1, wherein the first water isolating material disposed on the water inlet side has at least two openings to form multiple water inlet channels on the part of the water inlet side sealed by the first water isolating material.

3. The flow guide mesh as claimed in claim 1, wherein the at least one comb tooth is equidistantly arranged.

4. The flow guide mesh as claimed in claim 2, wherein the at least two openings are equidistantly arranged.

5. The flow guide mesh as claimed in claim 1, wherein the comb tooth has a width W1 and a length L1, a range of W1 is 18-22 mm, and a range of L1 is 80-100 mm.

6. The flow guide mesh as claimed in claim 5, wherein a distance between two adjacent comb teeth ranges from 8-12 mm.

7. The flow guide mesh as claimed in claim 2, wherein a width of each one of the at least two openings ranges from 3-8 mm, and a distance between two adjacent openings ranges from 60-80 mm.

8. The flow guide mesh as claimed in claim 1, wherein the water isolating material is polyurethane glue.

9. A membrane element comprising
    a lamination of a layer of water production diversion net;
    at least one layer of separation membrane; and
    a layer a flow guide mesh, and the flow guide mesh having
        a water inlet side;
        a water outlet side opposite to each other;
        a first water isolating material disposed on the water inlet side to seal a part of the water inlet side and define an effective water inlet width;
        a second water isolating material disport on the water outlet side to seal a part of the water outlet side and define an effective water outlet width; and
        a comb structure including at last one comb tooth within the effective water outlet width of the water outlet side;
    wherein the effecter water inlet width is 110%~140% of a vertical distance between the water inlet side and the water outlet side, the effective water outlet width is 60%~90% of the vertical distance between the water inlet side and the water outlet side, and a projection of the effective water inlet width of the water inlet side on the water outlet side is out of a range at the effective water outlet width.

10. The membrane element as claimed in claim 9, wherein the flow guide mesh is in contact with a water inlet surface of the separation membrane, and the water production diversion net is in contact with a water outlet surface of the separation membrane.

11. The membrane element as claimed in claim 10, wherein the separation membrane is folded, and the water production diversion net is sandwiched in the folded separation membrane.

12. The membrane element as claimed in claim 11, wherein the separation membrane is a reverse osmosis membrane or a nano filtration membrane.

13. The membrane element as claimed in claim 11, wherein
    sides of the water production diversion net, sides of the separation membrane, and sides of the flow guide mesh are aligned with each other, and the sides are adhered to each other by an adhesive;
    the water inlet side of the flow guide mesh does not adhere to the separation membrane and the water production diversion net at the effective water inlet width; and
    the water outlet side of the flow guide mesh does not adhere to the separation membrane and the water production diversion net at the effective water outlet width.

14. The membrane element as claimed in claim 13, wherein the adhesive is polyurethane glue.

15. A filter assembly comprising
a central water collection pipe; and
at least one layer a flow guide mesh, and the flow guide mesh having
a water inlet fide;
a water outlet side opposite to each other;
a first water isolating material disposed on the water inlet side to seal a part of the water inlet side and define an effective water inlet width;
a second water isolating material disposed on the water outlet side to seal a part of the water outlet side and define an effective water outlet width; and
a comb structure including at last one comb tooth within the effective water outlet width of the water outlet side;
wherein the effective water inlet width is 110%~140% of a vertical distance between the water inlet side and the water outlet side, the effective water outlet width is 60%~90% of the vertical distance between the water inlet side and the water outlet side, and a projection of the effective water inlet width of the water inlet side on the water outlet side is out of a range of the effective water outlet width.

16. The filter assembly as claimed in claim 15, wherein the filter assembly has multiple membrane elements, and the multiple membrane elements surround the central water collection pipe after stacked in sequence.

17. The filter assembly as claimed in claim 15, wherein the filter assembly is a cross flow filter assembly.

18. The flow guide mesh as claimed in claim 2, wherein the water isolating material is polyurethane glue.

19. The flow guide mesh as claimed in claim 3, wherein the water isolating material is polyurethane glue.

20. The flow guide mesh as claimed in claim 4, wherein the water isolating material is polyurethane glue.

21. A filter assembly comprising
a central water collection pipe; and
at least one layer of the membrane element, and the membrane element having
a lamination of a layer of water production diversion net;
at least one layer of separation membrane; and
a layer of a flow guide mesh, and the flow guide mesh having
a water inlet side;
a water outlet side opposite to each other;
a first water isolating material disposed on the water inlet side to seal a part of the water inlet side and define an effective water inlet width;
a second water isolating material disposed on the water outlet side to seal a part of the water outlet side and define an effective water outlet width; and
a comb structure including at least one comb tooth within the effective water outlet width of the water outlet side;
wherein
the effective water inlet width is 110%~140% of a vertical distance between the water inlet side and the water outlet side, the effective water outlet width is 60%~90% of the vertical distance between the water inlet side and the water outlet side, and a projection of the effective water inlet width of the water inlet side on the water outlet side is out of a range of the effective water outlet width; and
the flow guide mesh is in contact with a water inlet surface of the separation membrane, and the water production diversion net is in contact with a water outlet surface of the separation membrane.

22. The filter assembly as claimed in claim 21, wherein the filter assembly has multiple membrane elements, and the multiple membrane elements surround the central water collection pipe after stacked in sequence.

23. The filter assembly as claimed in claim 21, wherein the filter assembly is a cross flow filter assembly.

* * * * *